UNITED STATES PATENT OFFICE.

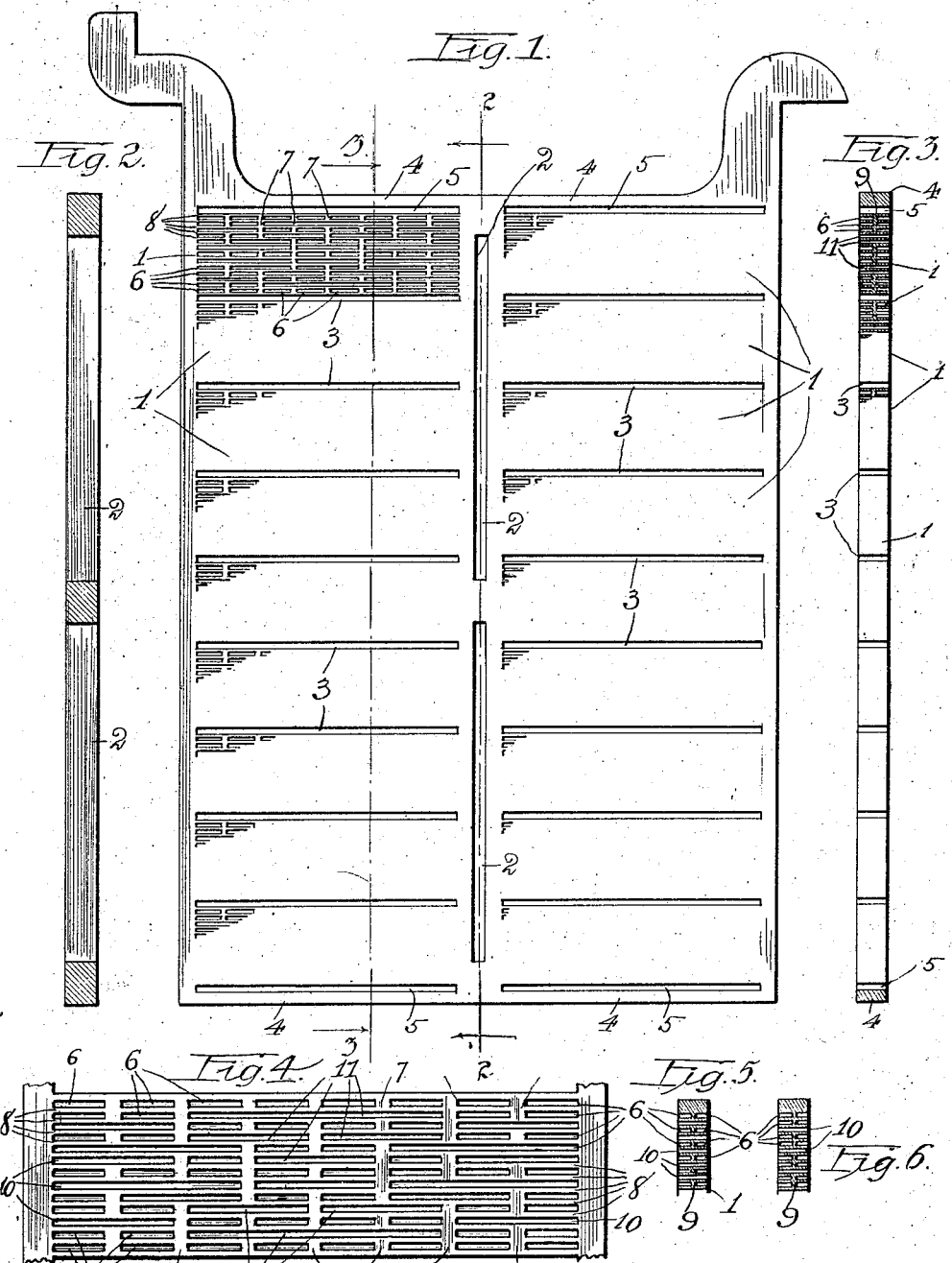

MICHEL KOENER, OF CHICAGO, ILLINOIS.

STORAGE-BATTERY PLATE.

1,071,322.　　　　　　Specification of Letters Patent.　　Patented Aug. 26, 1913.

Application filed August 28, 1912. Serial No. 717,470.

*To all whom it may concern:*

Be it known that I, MICHEL KOENER, a citizen of the United States, residing at Chicago, in the county of Cook and State of Illinois, have invented certain new and useful Improvements in Storage-Battery Plates; and I do hereby declare the following to be a full, clear, and exact description of the invention, such as will enable others skilled in the art to which it appertains to make and use the same.

This invention has for its object to provide a novel and efficient storage battery plate, and consists in the features of construction and combinations of parts hereinafter fully described and particularly claimed.

In the accompanying drawings illustrating the invention: Figure —1— is a view in elevation of one face of a storage battery plate embodying my invention. Fig. —2— is a central vertical section of the same on the line 2—2 of Fig. —1—. Fig. —3— is a vertical longitudinal section of the same on the line 3—3 of Fig. —1—. Fig. —4— is a fragmentary detail view in elevation on an enlarged scale of one cellular section of the plate. Figs. —5— and —6— are fragmentary detail vertical sectional views of the plate.

My invention relates particularly to storage battery plates of the type in which a very large number of small cells are provided which are adapted to become filled with oxid of lead formed by the action of electrolysis upon the metal of the plate.

The particular object of the invention is to provide a storage battery plate of the character defined which is rendered so freely expansible as to obviate warping and distortion thereof.

The plate comprises a plurality of relatively small sections or cell areas 1. These cell areas or sections 1 are disposed in a plurality of parallel rows extending vertically of the plate of which they form an integral part, said rows being separated from each other by the central longitudinal slots 2 in the plate. Each of said sections or cell areas 1 is further separated from the next contiguous section or area by means of a horizontal slot 3 between the same, and the end sections are also separated from the end or horizontal members or bars 4 of the plate by horizontal slots 5, all of said slots 3 and 5 being of a length equal to the width of each of said sections or areas 1. The latter are provided in opposite faces with a relatively large number of small elongated rectangular cells 6 separated from each other by the vertical and horizontal ribs 7 and 8 respectively. These cells on opposite sides or faces of each of the sections or areas 1 are preferably further separated from each other by a central web or partition 9 disposed midway between the outer faces of said sections or areas. In use upon charging the secondary battery the surfaces of the cellular faces of said sections or areas 1 which are made of lead, are changed to lead-oxid which fills the said cells and causes the latter to expand in all directions but most particularly in the direction of least resistance which would be transversely to the length of said cells. As the cells are oblong the pressure due to expansion of the surfaces thereof as the metal is changed to lead oxid and fills said cells, will cause separating pressure to be exerted on opposed walls of the cells and will exert greatest force upon the opposed walls of largest area, which, in the instance illustrated, are the horizontal and longer walls of said cells which are herein referred to as transverse ribs. The latter are also thinner than the vertical walls herein referred to as longitudinal ribs and will for this reason also yield more readily than the latter so that the horizontal walls will bulge and cause the cell area or section to expand vertically to a far greater degree than horizontally. But if the vertical ribs were continuous through each cell area or section the expansion of the latter would be greatly hindered and because of unavoidable variations in dimensions of cells and thickness of the horizontal ribs, would cause the cell area or section to become warped and distorted.

I have found it most convenient to arrange the cells and cell areas respectively as shown in the accompanying drawings but this may obviously be changed and varied without departing from the invention which has for its particular object to provide means whereby expansion of the plate can take place with such a degree of freedom as will relieve the structure of warping and distorting strains thereby imposed. In order to effect this it will be obvious that all parts of the cellular faces of the plate must be expansible with a substantially equal degree of freedom in all directions. By providing the slots 3 and 5 such expansion is rendered relatively free in one direction and the slots 2 permit such expansion in a transverse direction but in order to further promote such freedom of expansion, I provide in the body of each of said sections or areas 1, one or more horizontal slots 10 and 11 extending from face to face of each of said sections or areas 1. The number and relative disposition as well as the length of said slots 10 and 11 will be dependent upon the total area of the section or area 1 and the number of cells therein and will be proportioned thereto to take up in the middle portion or body of said plate some of the expansion. The width of the slots 3 and 5 will also be proportioned to the areas of said sections or areas 1 so as to allow sufficient room for expansion of the latter but will not provide a material surplusage of such space, it being well-known that the best results will be obtained by leaving the active plate area as much unbroken as possible. Each of said slots 10 and 11 will extend through the web 9 and through at least one of the vertical ribs 7, said slots being disposed in staggered relation so that each rib 7 will be cut at at least one point between its ends and preferably at a plurality of points. Expansion of said sections 1 laterally of the plate will be taken up in the slots 2 and by a lateral expansion and distortion of the outer edge portions of said plate, that is to say, the side edges of the latter will bulge outwardly as said sections or areas 1 expand in the direction of the length of the said cells 6.

My invention contemplates forming a very large number of very small cells in opposite faces of the plate separated from each other by very thin partition walls so that the surfaces exposed to the action of the acid content of the battery may cover the greatest possible area in proportion to the volume (and consequent weight) of lead employed. Thus the action of electrolysis will be very rapid and the cells will quickly fill up with the lead oxid and, unless freedom of expansion thereof is provided, warping and distortion will follow. This may also result from variation in thickness and strength of the ribs 7 and web 9 to cause an unequal distribution of strains on opposite sides of said web 9 and, by breaking these elements at intervals the inequality of strains is confined to such small subsections or cell areas as to be substantially unnoticeable and harmless, that is to say, the warping and distortion is at least localized if not entirely obviated.

I claim as my invention:

1. A storage battery plate having elongated cells in its opposite faces, there being slots in said plate arranged to divide the same into a plurality of cell areas and adapted to permit the latter to expand, each of said cell areas having slots therethrough extending parallel with the longer axes of said cells and of greater length than the latter, the said slots arranged in staggered relation to each other and subdividing the cell area into smaller cell areas, the latter disposed in staggered relation to each other and adapted to move relatively to each other as the cell area expands.

2. A cell area for storage battery plates bordered in part by free spaces along its edges and having longitudinal and transverse ribs on its opposite faces forming cells therein, there being a plurality of slots in the body of said area of less length than a dimension of the same and arranged parallel with one set of ribs and transversely of the other set thereof and intersecting the latter, said slots disposed in staggered relation to each other, whereby said area is subdivided into a plurality of smaller relatively staggered connected areas adapted to move relatively to each other as expansion due to electrolysis proceeds.

3. A cell area for storage battery plates having longitudinal and transverse ribs on its opposite faces forming cells therein, there being a plurality of slots in said area arranged parallel with one set of ribs and transversely of the other set thereof and intersecting the same, said slots disposed in staggered relation to each other.

4. In a storage battery plate, an area bordered in part by free spaces, said area provided on its opposite faces with longitudinal and transverse ribs providing a large number of small cells, there being relatively staggered slots in said area of less length than a dimension thereof and intersecting some of said ribs to render the same discontinuous through the dimension of the area longitudinally of said rib, whereby said area is rendered free to expand into the free spaces bordering the same.

5. In a storage battery plate an area bordered in part by free spaces, said area provided on its opposite faces with longitudinal and transverse ribs providing a large number of small cells, there being slots in said area at intervals intersecting some of said ribs to render the same discontinuous, whereby said area is rendered free to expand into the free spaces bordering the same, said slots disposed in staggered relation to each other.

6. In a storage battery plate an area bordered in part by free spaces, said area provided on its opposite faces with longitudinal and transverse ribs providing a large number of small cells, there being slots in said area at intervals intersecting some of said ribs to render the same discontinuous, whereby said area is rendered free to expand into the free spaces bordering the same, said slots disposed parallel with and in staggered relation to each other.

7. In a storage battery plate an area bordered in part by free spaces, said area provided on its opposite faces with longitudinal and transverse ribs providing a large number of small cells, there being slots in said area at intervals intersecting some of said ribs to render the same discontinuous, whereby said area is rendered free to expand into the free spaces bordering the same, said slots disposed parallel with one set of said ribs and in staggered relation to each other.

8. A storage battery plate having longitudinal and transverse ribs on its opposite faces, said longitudinal ribs being disposed at greater intervals than said transverse ribs and coacting with the latter to divide the plate surfaces into oblong cells, there being longitudinal and transverse slots in said plate disposed parallel with the respective ribs and dividing the plate into a plurality of rectangular cellular sections, there being a plurality of transverse slots in each of the latter and disposed in staggered relation to each other and each extending through at least one of said longitudinal ribs, each of said longitudinal ribs of each cellular section of said plate intersected between its ends by at least one of said lots.

9. A storage battery plate having longitudinal and transverse ribs on its opposite faces, said longitudinal ribs being disposed at greater intervals than said transverse ribs and coacting with the latter to divide the plate surfaces into oblong cells, there being longitudinal and transverse slots in said plate disposed parallel with the respective ribs and dividing the plate into a plurality of rectangular cellular sections, there being a plurality of transverse slots in each of the latter and disposed in staggered relation to each other and each extending through at least one of said longitudinal ribs, each of said longitudinal ribs of each cellular section of said plate intersected between its ends by at least one of said slots, the latter equal in width with said cells and bordered by said transverse ribs.

10. In a storage battery plate, an area bordered in part by free spaces along all of its edges and provided on each of its opposite faces with ribs extending transversely to each other and providing a relatively large number of small cells on each of said faces, there being a plurality of relatively staggered slots in said area each of less length than a dimension of the latter, each of said slots parallel with one set of said ribs and extending through at least one rib of the other set, each rib of the last-named set intersected by at least one of said slots and rendered discontinuous through the said area thereby.

11. In a storage battery plate, a plate area comprising a web having each of its edges bordered in part by a free space, said web provided on its respective faces with relatively transversely disposed ribs whereby each face is divided into a large number of small elongated cells adapted to be expanded by the action of electrolysis, each of the ribs of one set being intersected and rendered discontinuous by a slot through said web of a width substantially equal to the lesser dimension of a cell, whereby the portions of the rib on opposite sides of a slot are adapted to move relatively to each other substantially as and for the purpose specified.

12. A storage battery plate comprising a plurality of cellular plate areas, there being a free space bordering in part each edge of each of said areas for permitting expansion of the latter, the cells of said areas elongated and bordered by sets of relatively transversely disposed ribs, there being slots in each area of the width substantially of the smaller dimensions of a cell and each intersecting and rendering discontinuous through said area at least one rib of one set, said last-named slots of less width than the first-named and permitting relative movement of parts of each area as the expansion of the area by the action of electrolysis proceeds.

13. A storage battery plate comprising a plurality of cellular plate areas, there being a free space bordering in part each edge of each of said areas for permitting expansion of the latter, the cells of said areas elongated and bordered by sets of relatively transversely disposed ribs, there being slots in each area of the width substantially of the smaller dimensions of a cell and each intersecting and rendering discontinuous through said area at least one rib of one set, said last-named slots permitting relative movement of parts of each area as the expansion of the area by the action of electrolysis proceeds.

In testimony whereof I have signed my name in presence of two subscribing witnesses.

MICHEL KOENER.

Witnesses:
  RUDOLPH WM. LOTZ,
  M. M. BOYLE.